(12) United States Patent
Englehart et al.

(10) Patent No.: US 7,493,619 B1
(45) Date of Patent: Feb. 17, 2009

(54) METHODS FOR TRANSMITTING DATA BETWEEN TASKS OF DIFFERING PRIORITY IN A GRAPHICAL MODELING ENVIRONMENT

(75) Inventors: Matthew Englehart, Olmsted Township, OH (US); John Ciolfi, Wellesley, MA (US)

(73) Assignee: The MathWorks, Inc., Natick, MA (US)

( * ) Notice: Subject to any disclaimer, the term of this patent is extended or adjusted under 35 U.S.C. 154(b) by 899 days.

(21) Appl. No.: 10/914,867

(22) Filed: Aug. 9, 2004

(51) Int. Cl.
*G06F 9/46* (2006.01)
*H04L 9/00* (2006.01)

(52) U.S. Cl. ............... 718/103; 718/100; 719/313; 719/319; 713/161

(58) Field of Classification Search ......... 719/313–316, 719/319; 718/100–103; 713/161
See application file for complete search history.

(56) References Cited

U.S. PATENT DOCUMENTS

| | | | |
|---|---|---|---|
| 6,047,339 A | * | 4/2000 | Su et al. ............ 710/56 |
| 6,240,458 B1 | * | 5/2001 | Gilbertson ............ 709/232 |
| 6,510,517 B1 | * | 1/2003 | Bruhnke et al. ............ 713/168 |
| 2001/0029520 A1 | * | 10/2001 | Miyazaki et al. ............ 709/200 |
| 2001/0042080 A1 | * | 11/2001 | Ross ............ 707/506 |

* cited by examiner

*Primary Examiner*—Meng-Ai An
*Assistant Examiner*—Jennifer N To
(74) *Attorney, Agent, or Firm*—Lahive & Cockfield, LLP; Kevin J. Canning (57) ABSTRACT

A method and apparatus are disclosed for providing a rate transition block in a graphical modeling environment that is programmable by a user to specify data integrity during a data transfer operation between two operations operating in an asynchronous manner or between an operation operating in an asynchronous manner having a first priority and an operation operating in a synchronous manner having a second priority. The rate transition block is a multi-rate transition block generating code that is portable. The multi-rate transition block has more than one operation operating at more than one operating rate.

17 Claims, 10 Drawing Sheets

*Code fragment executed by task associated with input signal:* output_signal = input_signal;

*Code fragment executed by higher-priority task, associated with input signal:*

If(!global_boolean) {
   buffer = input_signal;
}

*Code fragment executed by lower-priority task, associated with output signal:* global_boolean = 1;
output_signal = buffer;
global_boolean = 0;

*Fig. 11* — 158

```
Code fragment executed by lower-priority task, associated with
input signal:

if(global_boolean) {
   buffer_1 = input_signal;
} else {
   buffer_0 = input_signal;
}
global_boolean = !global_boolean;

Code fragment executed by higher-priority task, associated with
output signal:

if(global_boolean) {
   output_signal = buffer_0;
} else {
   output_signal = buffer_1;
}
```

METHODS FOR TRANSMITTING DATA BETWEEN TASKS OF DIFFERING PRIORITY IN A GRAPHICAL MODELING ENVIRONMENT

TECHNICAL FIELD OF THE INVENTION

The present invention relates to graphical modeling environments, and more particularly, to data transfer between tasks in a graphical modeling environment.

BACKGROUND OF THE INVENTION

In a graphical modeling environment communication of data between tasks executed with different rate characteristics is problematic. One problem that arises in a multi-rate graphical model is the communication of data between two tasks having different priorities and one or both of the tasks execute at an asynchronous rate.

Figure 1:
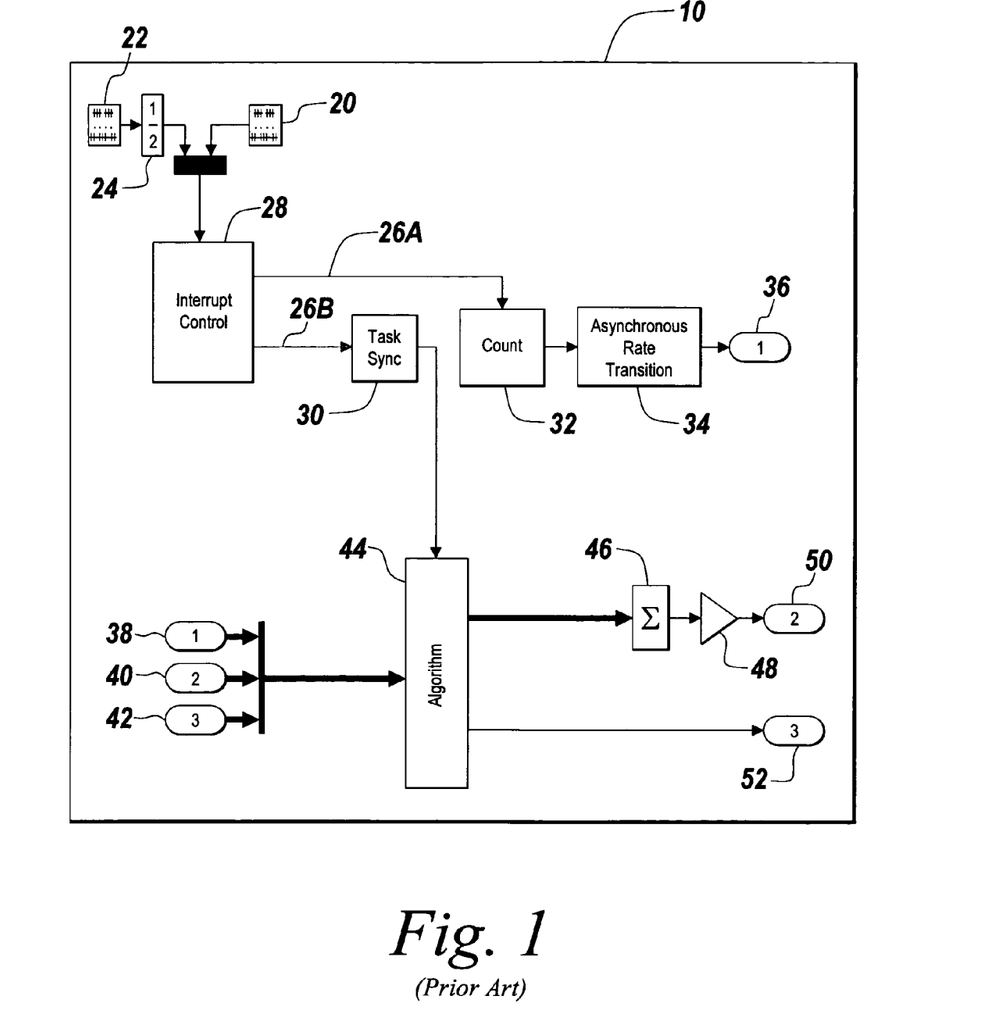
FIG. 1 is a Prior Art graphical modeling environment illustrating a multi-rate graphical model.

FIG. 1 illustrates a multi-rate graphical model 10 having a number of tasks that execute at various asynchronous rates. The tasks contain executable code generated by the illustrated blocks. An asynchronous rate is characterized as a rate of irregular occurrence (i.e. aperiodic). The multi-rate graphical model 10 also includes a number of blocks associated with tasks that execute at discrete rates. A discrete rate is characterized as a rate that occurs, or re-occurs, at regular intervals (i.e. periodic). In the multi-rate graphical model 10, task synchronization block 30, count block 32, asynchronous rate transition block 34, and algorithm block 44, are each associated with one or more tasks that execute at one or more asynchronous rates. In contrast, first time block 20, second time block 22, division block 24, interrupt control block 28, sum block 46 and gain block 48 are each associated with tasks that execute at discrete rates.

In the multi-rate graphical model 10, count block 32 is associated with a task that executes at a first asynchronous rate. The first asynchronous rate corresponds to the assertion of a first system interrupt 26A by the interrupt modeled by control block 28. The task synchronization block 30 is associated with a task that executes at a second asynchronous rate. The second asynchronous rate corresponds to assertion of a second interrupt 26B, modeled by the interrupt control block 28. Algorithm block 44 is associated with a task that executes at a third asynchronous rate. The third asynchronous rate corresponds to an aperiodic task modeled by the task synchronization block 30 as it services the second interrupt 26B.

In a real time implementation of the multi-rate graphical model 10, the tasks executing at discrete rates are assigned priorities based on the results of a scheduling algorithm, (for example, a rate monotonic algorithm that assigns the priority of each task according to its period so that the shorter of a period the higher the priority). By contrast, count block 32, task synchronization block 30, and algorithm block 44 are each associated with tasks operating with asynchronous rate characteristics. These tasks are assigned arbitrary priorities. That is, the arbitrary priorities can have priority levels above or below the priority levels assigned to any discrete task in the multi-rate graphical model 10.

Figure 2:
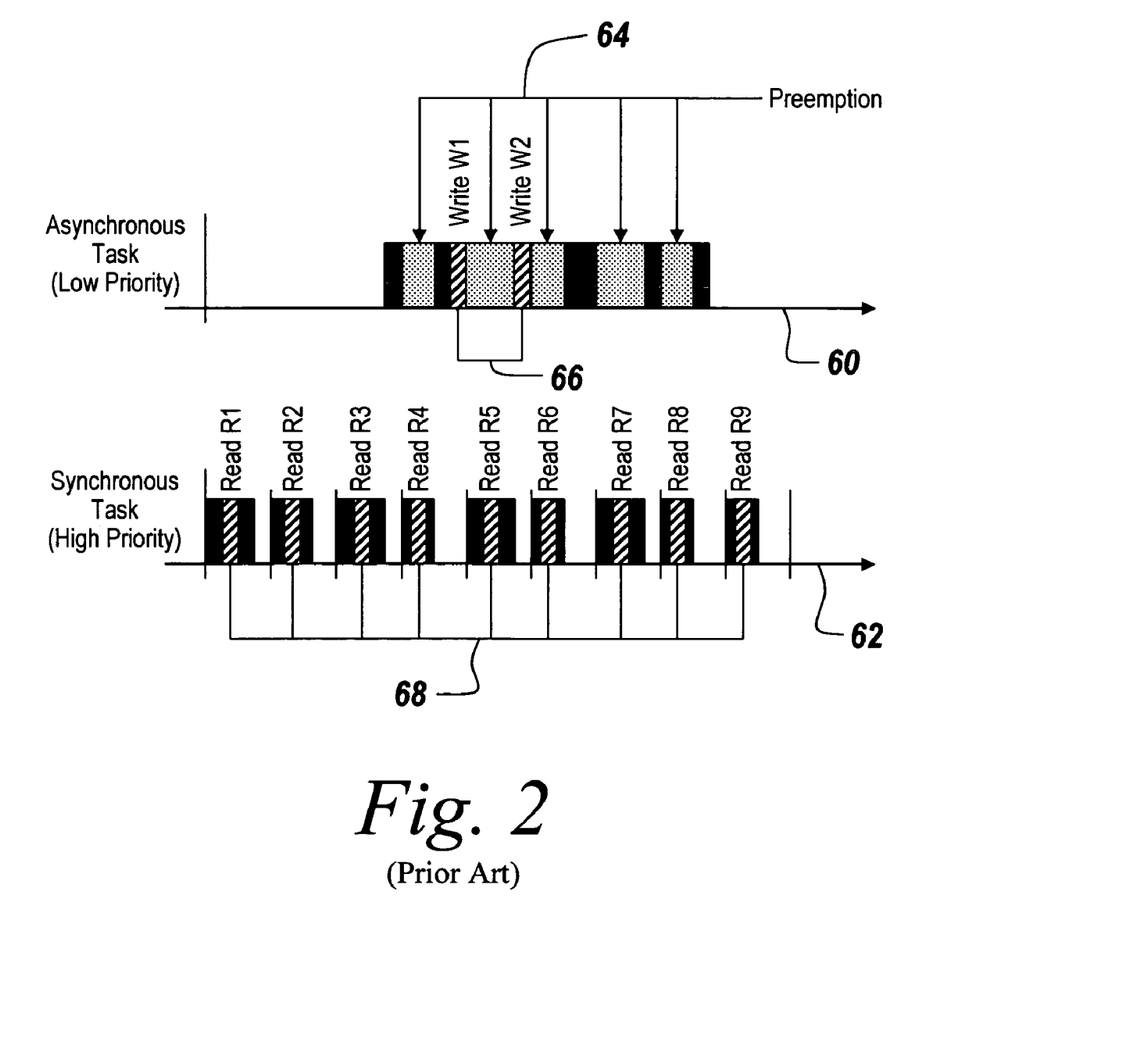
FIG. 2 is a Prior Art graphical timeline depicting a Prior Art data transfer in the multi-rate graphical model of FIG. 1.

FIG. 2 illustrates a first timeline 60 illustrating execution of an exemplary asynchronous task in the multi-rate graphical model 10, assigned a low priority and a second timeline 62 illustrating execution of an exemplary discrete task in the multi-rate graphical model 10, and assigned a priority higher than the asynchronous task. For purposes of the discussion below, timeline 60 is discussed in relation to a task associated with the algorithm block 44 that executes at a third asynchronous rate and timeline 62 is discussed in relation to a task associated with the sum block 46 that executes at a discrete rate assigned a higher priority than the third asynchronous rate of the algorithm block 44. Furthermore, for the discussion of FIG. 2, data transfer between tasks that are modeled by the connection between the sum block and the algorithm block is performed through the use of a global variable to which the tasks associated with algorithm block 44 and the sum block 46 share access.

For purposes of the discussion below, the data transferred is represented by a vector with ten elements and of data type double or 80 bytes. As such, because data is transferred from the task associated with algorithm block 44 to the task associated with sum block 46 without any assurances of data integrity in the multi-rate graphical model 10, there are instances when the task associated with algorithm block 44 is in the process of updating the associated memory space when the task associated with sum block 46, having the higher priority, preempts the data write of the task associated with algorithm block 44. Consequently the preemption of the memory write operation by the task associated with the sum block 46 results in the task associated with sum block 46 reading partially updated data from the memory space, hence causing problematic results due to the use of partially updated or corrupted data.

Timelines 60 and 62 depict such a scenario. Time intervals 64 of timeline 60 represent the preemption of the asynchronous task, for example a task associated with algorithm block 44 that is preempted by a task having synchronous rate characteristics associated with sum block 46, which is represented by timeline 62. Time intervals 66 of timeline 60 represent portions of a total time period (write W1+write W2) for the task associated with algorithm block 44 to carry out a memory write operation. Time intervals 68 (R1-R9) of timeline 62 represent individual time intervals for the discrete task associated with sum block 46 to perform a read operation from memory. As depicted in timelines 60 and 62, the asynchronous task associated with algorithm block 44 is in the process writing to memory at write W1 when the synchronous task associated with sum block 46 preempts the write operation resulting in the discrete task associated with sum block 46 reading partially updated or corrupted data. Consequently the data transfer between a task having a first rate characteristic and a first priority to a task having a second rate characteristic and a second priority is problematic.

Figure 3:
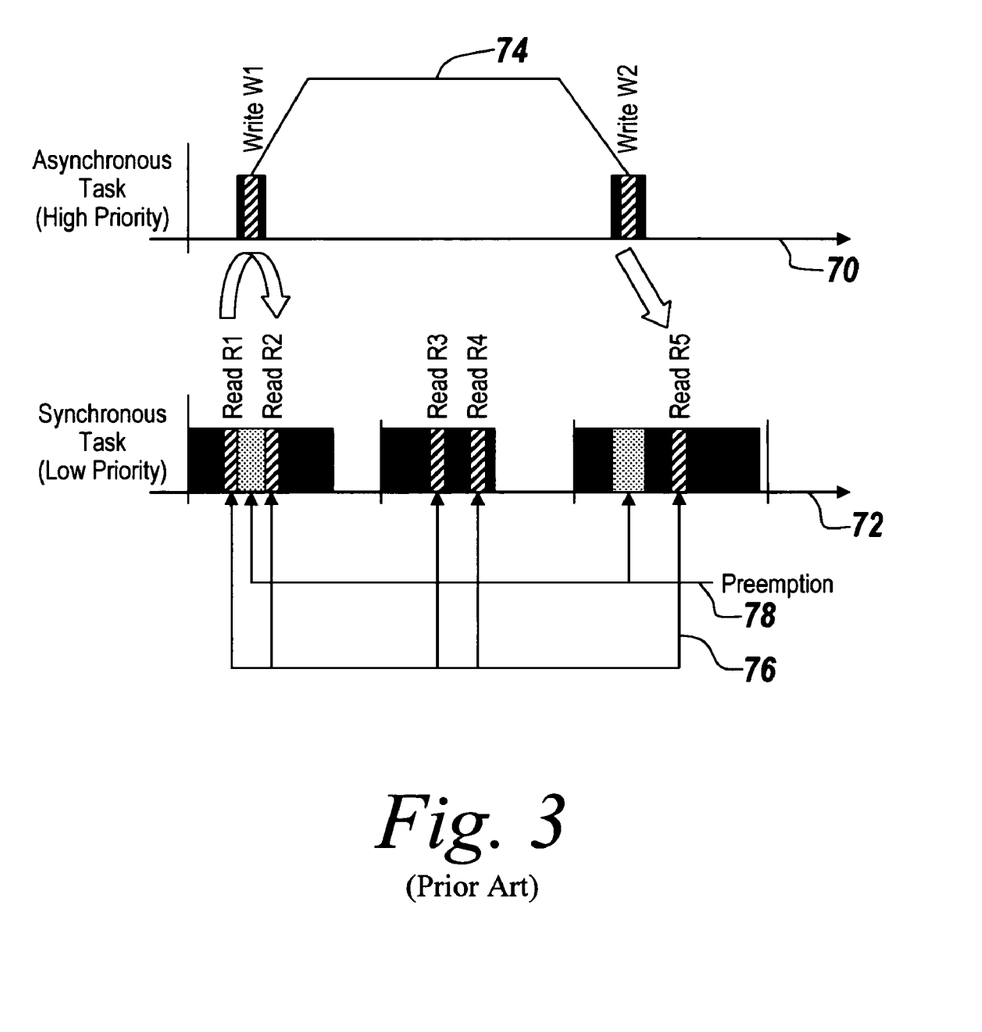
FIG. 3 is a Prior Art graphical timeline depicting a Prior Art data transfer in the multi-rate graphical model of FIG. 1.

As discussed in relation to FIG. 2, the data transfer is between an asynchronous task and a synchronous task when the asynchronous task is assigned a lower priority than the synchronous task results in problematic data transfers. Nevertheless, problematic data transfers also occur in a multi-rate graphical model when the asynchronous task is assigned a priority higher than an associated synchronous task. FIG. 3 depicts timelines 70 and 72 representing a data transfer between an asynchronous task and a synchronous task when the asynchronous task is assigned a higher priority then the synchronous task. Timeline 70 represents the operation of the asynchronous task assigned a high priority relative to an assigned priority of an associated synchronous task in the multi-rate graphical model 10. Timeline 72 represents operation of the synchronous task assigned a lower priority relative to the priority assigned to an asynchronous task operating in the multi-rate graphical model 10. For purposes of the following discussion, the asynchronous task represented by timeline 70 corresponds to an asynchronous task associated with algorithm block 44 while the synchronous task represented by timeline 72 corresponds to a synchronous task associated with sum block 46.

As depicted by timelines 70 and 72 the synchronous task associated with sum block 46 performs multiple read operations (R1-R5) at time intervals 76, and the asynchronous task of algorithm block 44 performs multiple write operations (W1-W2) to memory at time intervals 74. Hence, because the asynchronous task associated with algorithm block 44 is assigned a higher priority than the synchronous task associated with sum block 46 the asynchronous task, when accessing the memory spaced shared by the tasks, preempts the synchronous task at time intervals 78 of timeline 72. As such, when the synchronous task of sum block 46 performs a first read (R1), from memory the asynchronous task associated with algorithm block 44 preempts the first read (R1) to update memory by carrying out a first portion of a write operation (W1) as depicted in timeline 70. As a result, the discrete task associated with sum block 46 continues or starts a second read (R2) upon completion of the first portion of a write operation (W1). Consequently, the read operation of the discrete task associated with the sum block 46 reads partially updated data and hence results in a corrupted data operation.

FIGS. 2 and 3 illustrate the lack of certainty regarding data integrity that can occur when transferring data between two tasks having different operating rate characteristics assigned different priorities. Although the lack of certainty regarding data integrity is described in context between a synchronous task and an asynchronous task, like difficulties apply in data transfer operations in a context between two synchronous tasks and in a context between two asynchronous tasks. To address the lack of certainty regarding data integrity in such data transfers, a number of data transfer mechanisms have been developed to provide an assurance of data integrity when transferring data between tasks having different operating rate characteristics and different priorities. One such data transfer mechanism uses a non-portable semaphore to control access to the memory space shared by the two tasks having the different operating rate characteristics and different priorities.

Figure 4:
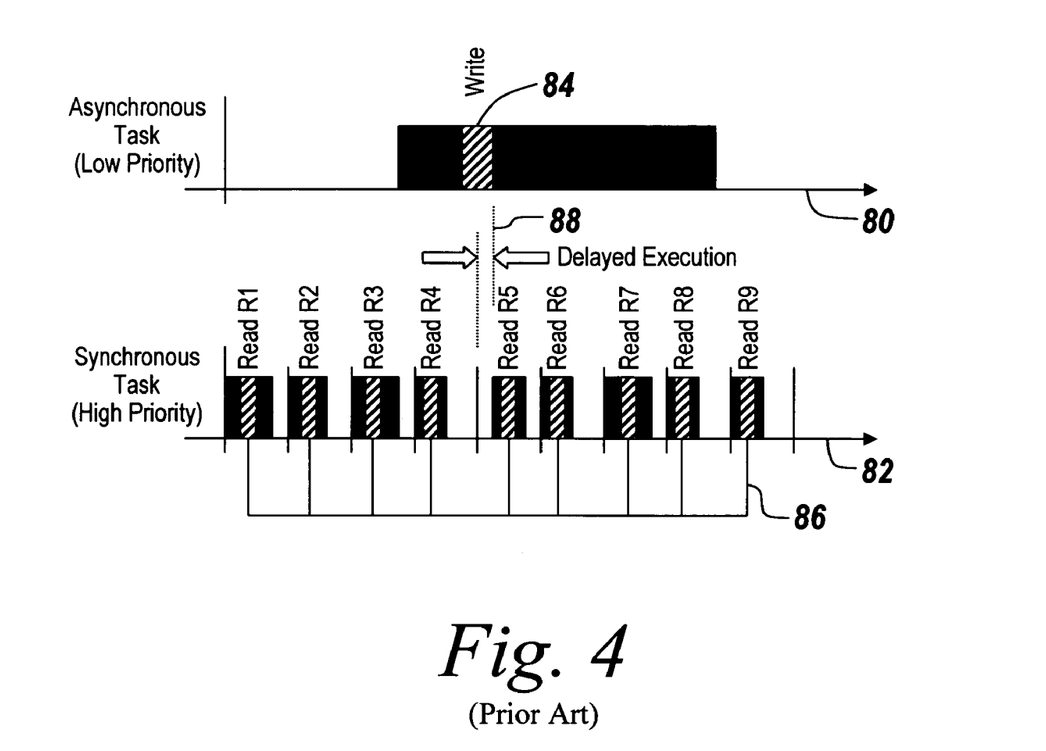
FIG. 4 is a Prior Art graphical timeline depicting a Prior Art data transfer in the multi-rate block graphical model of FIG. 1.

FIG. 4 depicts two timelines 80 and 82 representing use of a non-portable semaphore to control access to memory space shared between an asynchronous task and a synchronous task where the asynchronous task is assigned a lower priority than a synchronous task. For illustrative purposes timeline 80 represents an asynchronous task associated with algorithm block 44 and timeline 82 represents a synchronous task associated with sum block 46. As timeline 82 depicts, the synchronous task associated with sum block 46 performs a number of read operations (R1-R9) at time intervals 86. Timeline 80 depicts the asynchronous task associated with algorithm block 44 as performing a write operation at time interval 84 to the memory space shared with the synchronous task associated with sum block 46. As timelines 80 and 82 illustrate, the asynchronous task associated with algorithm block 44 is able to complete the write operation during time interval 84 without being preempted by the synchronous task associated with sum block 46. That is, read R5 of the synchronous task does not preempt the write operation of the asynchronous task, however, the execution of the higher priority synchronous task associated with sum block 46 is delayed as illustrated by time period 88. Although assurance of data integrity is accomplished through the use of a non-portable semaphore shared between the asynchronous task and the synchronous task, task preemption is disabled which can lead to further problems, such as delayed execution in a real time operating system.

Figure 5:
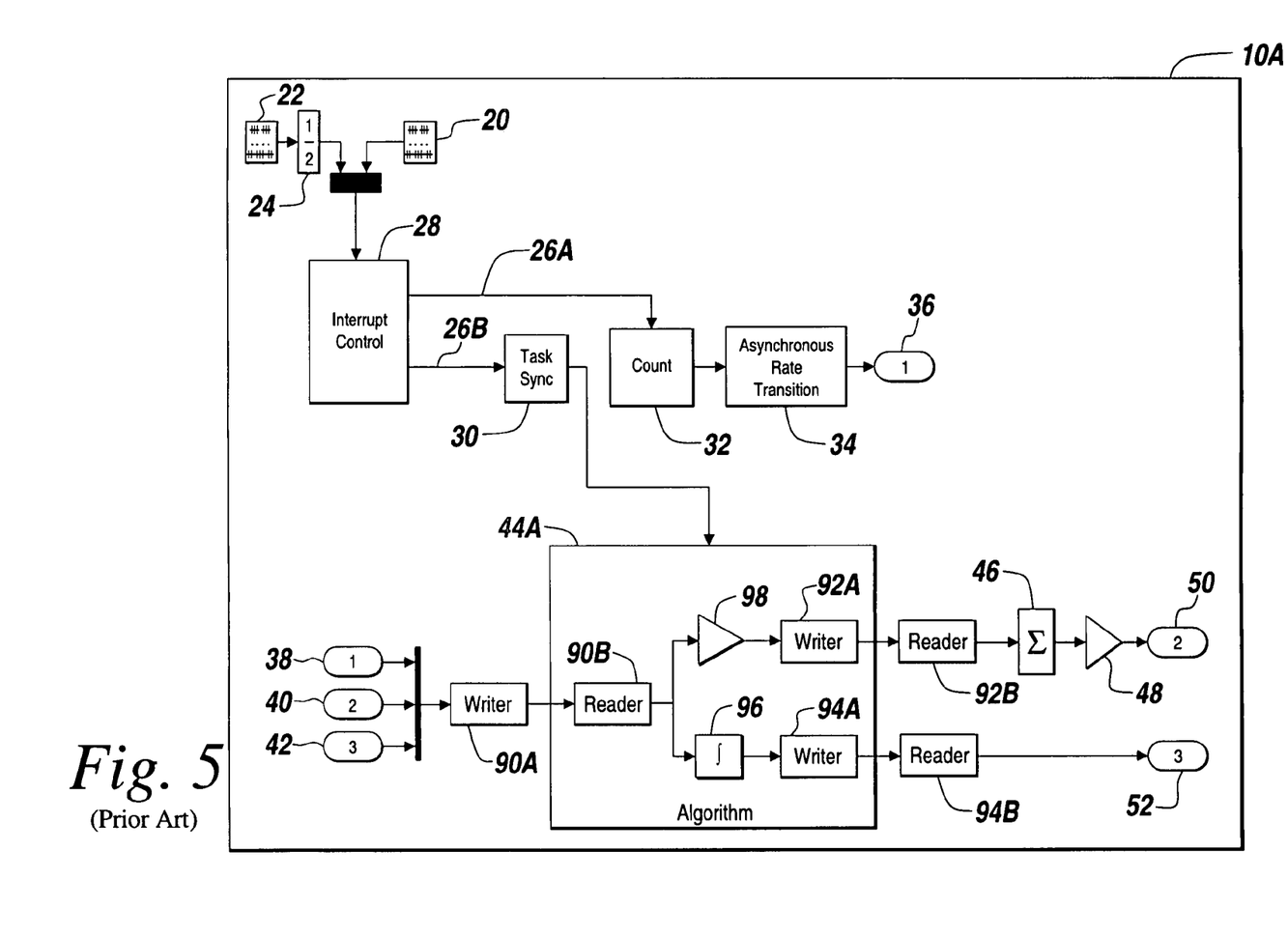
FIG. 5 is a Prior Art graphical timeline depicting a Prior Art data transfer in the multi-rate block graphical model of FIG. 1.

Another known solution for ensuring data integrity when transferring data between blocks associated with tasks having different operating rate characteristics and different priorities is the use of writer block and reader block pairs. FIG. 5 illustrates such a known solution. Multi-rate graphical model 10A in addition to like blocks discussed above with reference to FIG. 1 includes algorithm block 44A. Algorithm block 44A includes a reader block 90B, an integration block 96, a gain block 98, a writer block 92A, and a writer block 94A. To address the issue of ensuring data integrity, multi-rate graphical model 10A includes a first writer/reader block pair in writer block 90A and reader block 90B, a second writer/reader block pair in writer block 92A and reader block 92B, and a third writer/reader block pair in writer block 94A and reader block 94B. This known solution employs writer/reader block pairs on each signal line in the multi-rate graphical model wherever a rate transition occurs.

For example, in multi-rate graphical model 10A a rate transition occurs between input nodes 38, 40, 42 and an input node of the integration block 96 and an input node of the gain block 98. Accordingly, a pair of writer/reader blocks such as, the pair defined by writer block 90A and reader block 90B is placed between the input nodes 38, 40, 42 and the input nodes of the integration block 96 and the gain block 98 to provide data integrity when transferring data between these nodes. Likewise, a rate transition occurs between an output node of the integration block 96 and third output node 52. As such, multi-rate graphical model 10A is configured to include a second writer/reader block pair formed by writer block 92A and reader block 92B. Similarly, a rate transition occurs between an output node of gain block 98 and an input node of sum block 46. As such, multi-rate graphical model 10A is configured to include a third writer/reader block pair formed by writer block 94A and reader block 94B.

Unfortunately, use of writer/reader block pairs requires disabling interrupts within the generated real-time application for example, first interrupt 26A and second interrupt 26B. Moreover, the writer/reader block pairs use a double buffering mechanism to transfer data between two portions of multi-rate graphical model 10A that execute with different rate characteristics and are therefore not well suited for use in a real time operating system.

Although a number of known techniques are available to provide data integrity when transferring data between tasks in a multi-rate graphical model having different operating rate characteristics and priorities, many of these known solutions are considered non-portable because they rely on supplier specific extensions to ANSI C, or disabling of interrupts. Furthermore, many of the known solutions require problematic and unnatural modeling constructs, such as the use and pairing of reader blocks and writer blocks. Moreover, the known solutions do not provide the ability for a user or creator of a multi-rate graphical model to selectively enable and disable data integrity to perform trade off studies between assurance of data integrity when transferring data between tasks in the model, and any resource overhead that such an assurance imposes, for example, memory overhead and throughput overhead. Accordingly, a need exists for a data transfer mechanism that overcomes such known problems.

SUMMARY OF THE INVENTION

The illustrative embodiment of the present invention addresses the above-described limitations of the conventional methods for transferring data between a first task in a graphical modeling environment having a first operating rate characteristic assigned a first priority and a second task in a graphical modeling environment having a second operating rate characteristic assigned a second priority. The illustrative embodiment provides methods and apparatuses that allow data transfers between tasks in a graphical modeling environment operating with different rate characteristics and priorities to preserve data integrity during the transfer. The methods of the illustrative embodiment are considered portable in that they are well suited for practicing on a number of software and hardware platforms, and in particular can be effected using only programming constructs available in the ANSI-C programming language.

In one aspect of the present invention, a method is performed in an electronic device providing a graphical modeling environment. Performance of the method provides a rate transition block that models the interface between a first task in the graphical modeling environment having a first operating rate characteristic and a first priority and a second task in the graphical modeling environment having a second operating rate characteristic and a second priority. At least one of the first and second operating rate characteristic has an asynchronous characteristic. The rate transition block is configured to control a selected data transfer characteristic of the data transferring between the first and second task. Accordingly, the method transfers data through code associated with the rate transition block to control the selected data transfer characteristic.

The selected data transfer characteristic can provide data integrity to ensure transferred data values are used in a consistent manner by one of the first and second tasks. Moreover, the method operates independent of a software platform operating on the electronic device.

In another aspect of the present invention, a method is carried out in an electronic device providing a graphical modeling environment. Execution of the method transfers data between a task associated with a first block from the graphical modeling environment operating at a first rate and assigned a first priority and a task associated with a second block from the graphical modeling environment operating at a second rate and assigned a second priority. The method includes a step of selecting a parameter of a transfer mechanism interfaced with the first block and the second block to control a data transfer between the task associated with the first block and the task associated with the second block. The transfer mechanism is configured to control characteristics of the transfer of data between the first and second blocks. When a parameter of the transfer mechanism is selected, the data is transferred between the task associated with the first block and the task associated with the second block with the transfer mechanism controlling the transfer of data according to a data property associated with the selected parameter.

The transferring of the data between the tasks associated with first and second blocks includes a step of setting a portable marker to indicate when one of the two tasks is writing data for transfer between the two tasks. The step of transferring can further include a step of setting a portable marker that indicates when one of the first and second tasks is reading the transferred data. Further, the step of transferring can further include a step of setting a variable that indicates when one of the first and second tasks is writing data for transfer to the other task. The step of transferring can further include a step of setting a variable that indicates when one of the first and second tasks is reading the transferred data. In one aspect of the present invention, the first task executes at an asynchronous rate having aperiodic characteristics and the second task executes at a synchronous rate having periodic characteristics.

In one aspect of the present invention, an electronic device for use in practicing a graphical modeling environment is provided. The electronic device includes an input device for use by the user and a user interface responsive to inputs from the user for specifying a data transfer characteristic of a data transfer between a first task in the graphical modeling environment having a first priority and a second task in graphical modeling environment having a second priority. At least one of the tasks operates asynchronously. The electronic device further includes a display device for viewing by a user. The electronic device renders the user interface on the display device to allow the user to specify the data transfer characteristics.

In another aspect of the present invention, an electronic device program product is disclosed. The electronic device program product includes instructions executable by an electronic device which, when executed by a processor of the electronic device causes the device to provide a graphical modeling environment having a rate transition block that models the interface between a first task in the graphical modeling environment operating at a first priority and a second task in the graphical modeling environment operating at a second priority. The rate transition block controls a selected data transfer characteristic of data transferring between the first and second tasks. Execution of instructions held by the electronic device program product transfers the data using code generated from the rate transition block located between the first and second tasks to control the selected data transfer characteristic. The data transfer characteristics are selectable by a user of the electronic device. At least one of tasks executes asynchronously.

In still another aspect of the present invention, a device readable medium holding device readable instructions for performing a method for transferring data between a task associated with a first block in a graphical modeling environment operating with a first rate characteristic and a first priority and a task associated with a second block in the graphical modeling environment operating at a second rate and a second priority is disclosed. The method includes a step of selecting a property of a transfer mechanism interfaced with the tasks associated with the first block and the second block. The transfer mechanism controls the transfer of data between the tasks associated with first and second blocks. A further step of the method transfers the data between the tasks associated with the first block and the second block. The transfer mechanism controls the transfer of data between the tasks associated with the first block and the second block according to the selected property. Further steps of the method set a portable marker that indicates when one of the tasks associated with the first and second blocks is writing data for transferring and sets a portable marker that indicates when one of the tasks associated with the first and second blocks is reading transferred data. Additional steps of the method set a variable that indicates when one of the tasks associated with the first and second blocks is writing data for transferring and setting a variable that indicates when one of the tasks associated with the first and second blocks is reading transferred data. In one aspect, the first task has an asynchronous rate having an aperiodic characteristic. In another aspect, the second task has a synchronous rate having a periodic characteristic.

BRIEF DESCRIPTION OF THE DRAWINGS

An illustrative embodiment of the present invention will be described below relative to the following drawings.

DETAILED DESCRIPTION

Before continuing with the detailed description, it will be helpful to the reader to first define a few terms used throughout the specification.

As used herein the terms "asynchronously", "asynchronous rate", and "asynchronous" refer to an executable program, a portion of an executable program, or both that executes with an irregular occurrence (i.e. at an aperiodic rate).

As used herein the terms "discrete", "synchronously", "synchronous rate", and "synchronous" refer to an executable program, a portion of an executable program, or both that executes with a regular occurrence (i.e. at a periodic rate).

The illustrative embodiment of the present invention provides methods and apparatuses for allowing data transfers between two tasks in a graphical modeling environment operating with different rate characteristics and different priorities to realize data transfers between such tasks that ensure data integrity. This allows a multi-rate model in a graphical modeling environment to have tasks operating with synchronous rate characteristics assigned a first priority and asynchronous rate characteristics assigned a second priority to realize data integrity when transferring data between such tasks. Through the use of a rate block placed between the blocks of the model that are associated with tasks operating with different rate characteristics and different priorities, the methods and apparatuses of the present invention allow a user to select between data integrity and no data integrity for data transfers between the two tasks. The methods and apparatuses of the present invention allow use of rate blocks that control the transfer of data between two tasks operating with different rate characteristics and different priorities across a number of hardware and software platforms. In this manner, the methods and apparatuses of the present invention help assure data integrity in real-time applications generated from multi-rate graphical models even when data is transferred between two or more tasks operating with different rate characteristics and different priorities. The methods and apparatuses of the present invention also allow the user to select and configure each data transfer operation between tasks operating with different rate characteristics and priorities.

Figure 6:
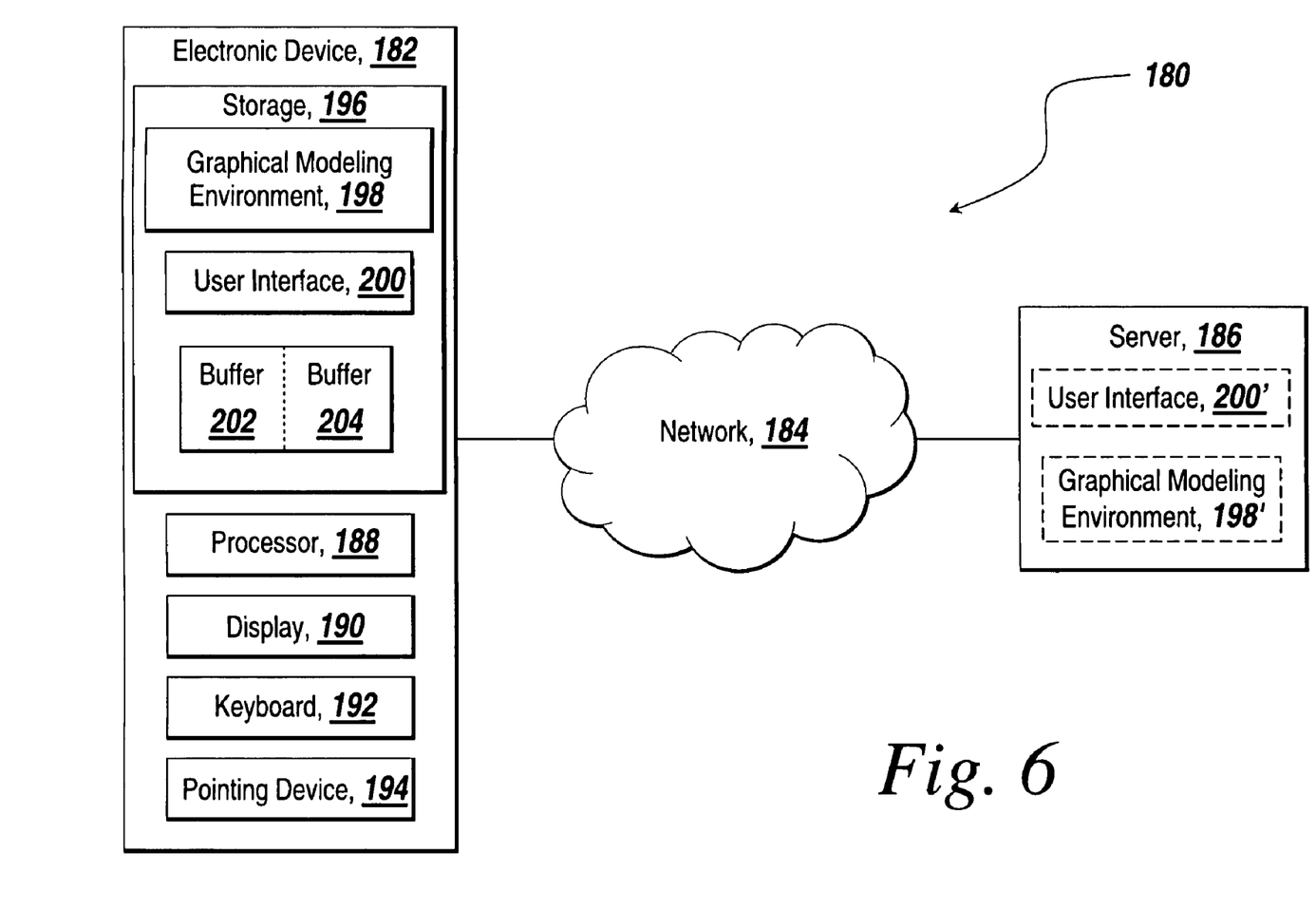
FIG. 6 depicts a graphical modeling environment suitable for practicing the illustrative embodiment of the present invention.

FIG. 6 illustrates an environment suitable for practicing the illustrative embodiment of the present invention. A computer system 180 includes an electronic device 182, a network 184, such as the Internet, an intranet, or other suitable network either wired, wireless, or a hybrid of wired and wireless and, optionally, a server 186 or other electronic device. The electronic device 182 includes a processor 188 for executing various instructions and programs, and controlling various hardware and software components. The electronic device 182 also includes a display device 190 for use in rendering textual and graphical images, a storage device 196 for storing various items such as data, information and programs. A keyboard 192 and a pointing device 194 are also included with the electronic device 182. The pointing device 194 includes such devices as a mouse, trackball, or light pen. Those skilled in the art will recognize that the pointing device 194 can be incorporated with the display device 190 to provide the electronic device 182 with a touch screen that allows the user to interact with the electronic device 182 with a stylus or other means such as a user's finger.

The storage device 196 includes a graphical modeling environment 198 for use in developing and executing block diagram models. One suitable graphical modeling environment for use in practicing the illustrative embodiment of the present invention is Simulink® from MathWorks, Inc. of Natick, Mass. Nevertheless, those skilled in the art will appreciate that the features of the illustrative embodiment of the present invention described above and below are equally applicable to other graphical modeling environments for example, LabView, System View, Signal Processing Workstation, HyperSignal, COSSAD, PTOLEMY and other like block diagram environments. The storage device 196 and hence the electronic device 182 further include user interface 200, first buffer 202 and second buffer 204.

Figure 7:
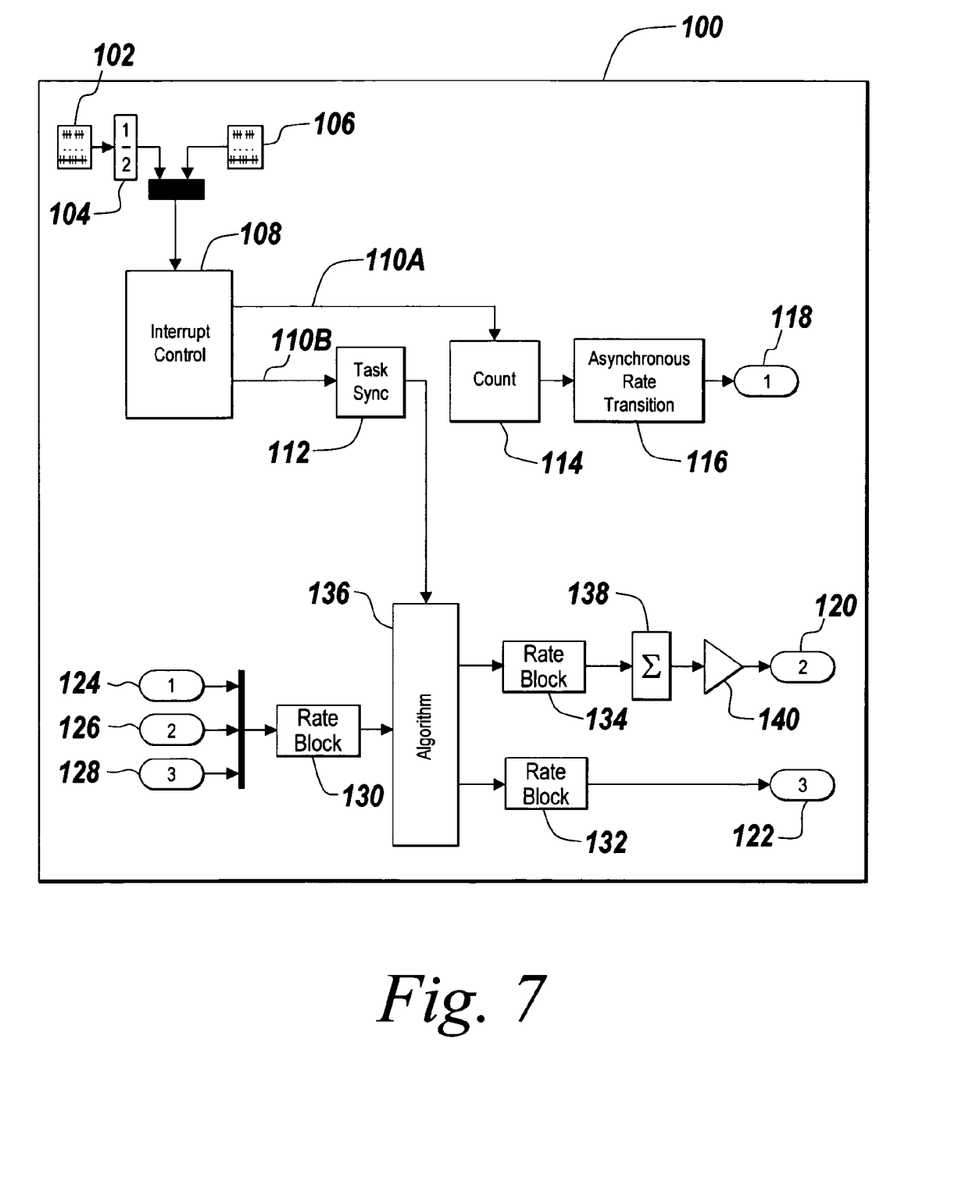
FIG. 7 is an exemplary multi-rate graphical modeling environment suitable for practicing the illustrative embodiment of the present invention.

The user interface 200 in conjunction with the graphical modeling environment 198 provide a user of the system 180 with textual and graphical information that allow a user to browse and configure each of the rate transition blocks 116, 130, 132, and 134 in FIG. 7 to control data transfer characteristics of data transferred between tasks in a graphical modeling environment operating with different rate characteristics and priorities. The user interface 200, from a user's perspective, is discussed below in more detail with reference to FIG. 13.

Server 186 is coupled to network 184 and includes the graphical modeling environment 198' and user interface 200'. In this manner, a number of users are able to access the user interface 200' via the network 184 without the need to have each user running a local copy of the user interface 200' and the graphical modeling environment 198'. Those skilled in the art will recognize that the electronic device 182 includes other software such as, other user interfaces and other programs, such as one or more OS programs, compilers and various other program applications developed in a variety of programming environments for controlling system software and hardware components.

FIG. 7 illustrates a multi-rate graphical modeling environment suitable for practicing the illustrative embodiment of the present invention. Multi-rate graphical model 100 includes first time block 102, second time block 106, divider block 104, interrupt control block 108, task synchronization block 112, count block 114, rate transition block 116, and first output node 118. The multi-rate graphical model 100 further includes first input node 124, second input node 126, third input node 128, rate transition block 130, algorithm block 136, rate transition block 134, sum block 138, gain block 140, second output node 120, rate transition block 132 and third output node 122.

The first time block 102 is coupled to divider block 104 which, in turn, provides a first time based input signal to interrupt control block 108. Second time block 106 provides a second time based input to the interrupt control block 108. The interrupt control block 108 asserts a first interrupt 110A to count block 114. The interrupt control block 108 asserts a second interrupt 110B to task synchronization block 112, which, in turn, asserts an output signal to a first input of algorithm block 136. The count block 114 asserts an output signal to rate block 116 which, in turn, asserts an output signal to first output node 118. First input node 124, second input node 126 and third input node 128 each provide an input signal to rate transition block 130. Rate transition block 130 asserts an output signal to a second input of the algorithm block 136. The algorithm block 136 includes a first output coupled to rate transition block 134, which has an output coupled to an input of sum block 138. The sum block 138 has an output coupled to an input of gain block 140. The gain block 140 has an output coupled to second output node 120. A second output of the algorithm block 136 is coupled to an input of rate transition block 132 which has an output coupled to third output node 122.

FIG. 7 illustrates the use of sole instances of rate transition blocks, for example, rate transition blocks 116, 130, 132, and 134 for configuring the data transfer between tasks of the multi-rate graphical model 100 having operating rates that exhibit different characteristics and assigned different priorities. Each rate transition block 116, 130, 132 and 134 permit a user of the multi-rate graphical model 100 to selectively enable or disable data integrity for each specific instance of data transfer between tasks assigned different priorities and operating with rates having different characteristics tasks. Each rate transition block 116, 130, 132 and 134 is a multi-rate block. That is, a portion of the code generated from each rate transition block 116, 130, 132 and 134 operates at the rate of an input, for example, if an input node of a rate transition block receives a signal from an asynchronous task having an asynchronous rate, the input node of the receiving rate transition block operates with asynchronous rate characteristics. Accordingly, other portions of the code generated from each rate block 116, 130, 132 and 134 carry out operations at the rate of an output port, for example at a synchronous rate. In this manner, when code is generated for each rate transition block 116, 130, 132 and 134 two separate code fragments are generated. A first code fragment is executed by the task associated with the input rate and a second code fragment is executed by the task associated with an output rate.

In this manner, data is modeled as being received by each rate transition block 116, 130, 132 and 134 at a rate that matches the task asserting the data and in turn, each rate transition block 116, 130, 132 and 134 asserts the received data on an output node at a rate compatible with an input node of a block associated with the output of a selected rate transition block. In this manner, each rate transition block 116, 130, 132 and 134 model the transition of data from a first rate having first rate characteristics to a second rate having second rate characteristics to provide enhanced data transfer characteristics between tasks having two different rate characteristics and in turn different priorities. In some data transfer operations, those skilled in the art will recognize that data integrity is intrinsically assured and such operations do not require a rate transition block as a transfer mechanism. Such instances include the communication of a scalar Boolean value which is considered an atomic operation because all of the data can be transferred in one clock cycle or less.

Figure 8:
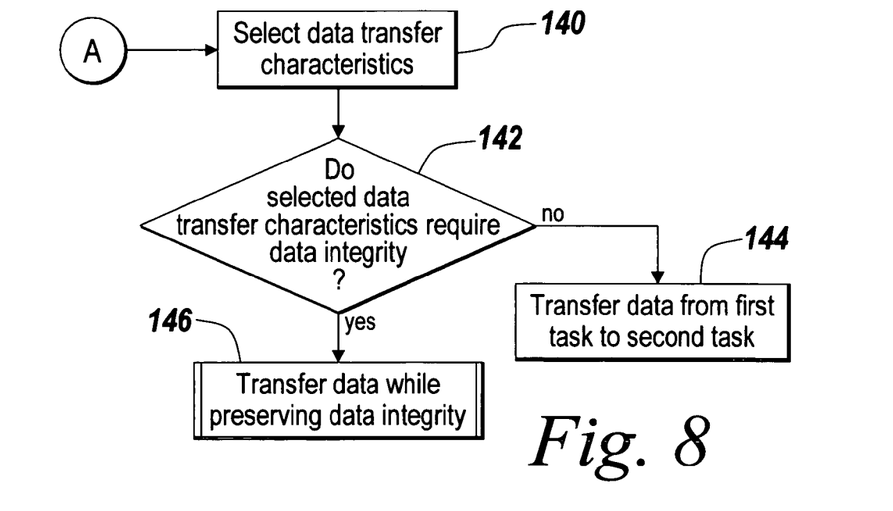
FIG. 8 is an exemplary flowchart that provides an overview of steps taken to practice the illustrative embodiment of the present invention.
Figure 9:
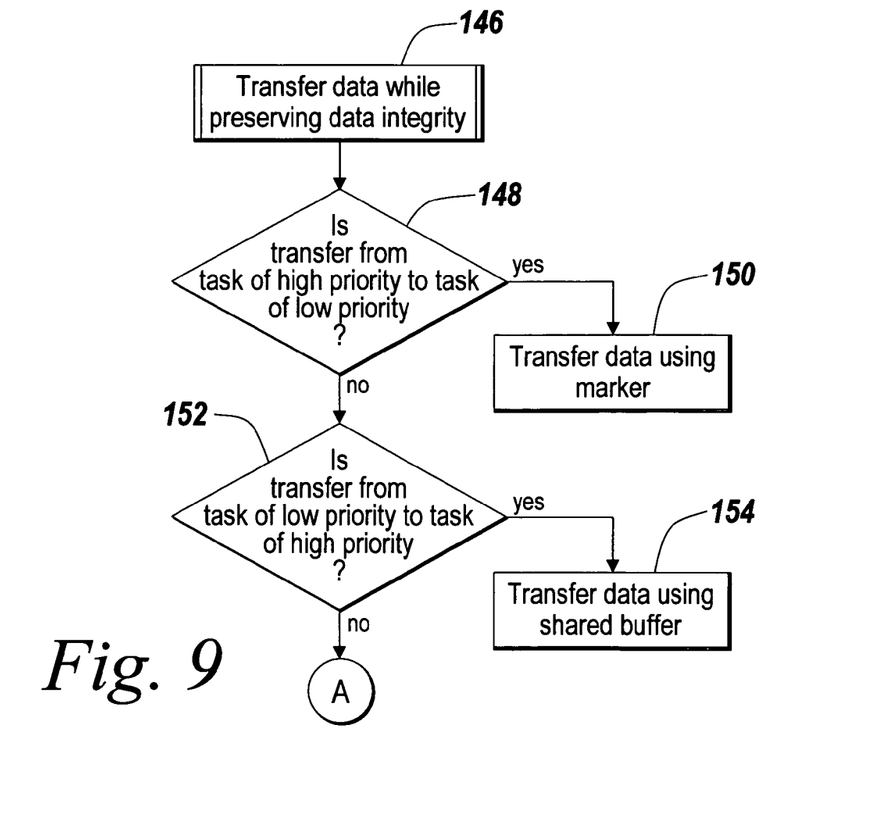
FIG. 9 is an exemplary flowchart that provides further detail of a step in FIG. 8 to ensure data integrity when transferring data.

FIGS. 8 and 9 illustrate steps taken to model the transfer of data using rate transition blocks 116, 130, 132, and 134 between tasks in a graphical modeling environment operating with different rate characteristics and assigned different priorities. For the ease of the discussion below the rate transition block 130 and the data transfer between the first input node 124 and the algorithm block 136 are discussed in detail to facilitate explanation. Nevertheless, those skilled in the art will recognize that the discussed details are equally applicable to the other illustrated rate transition blocks 116, 132, and 134.

Figure 13:
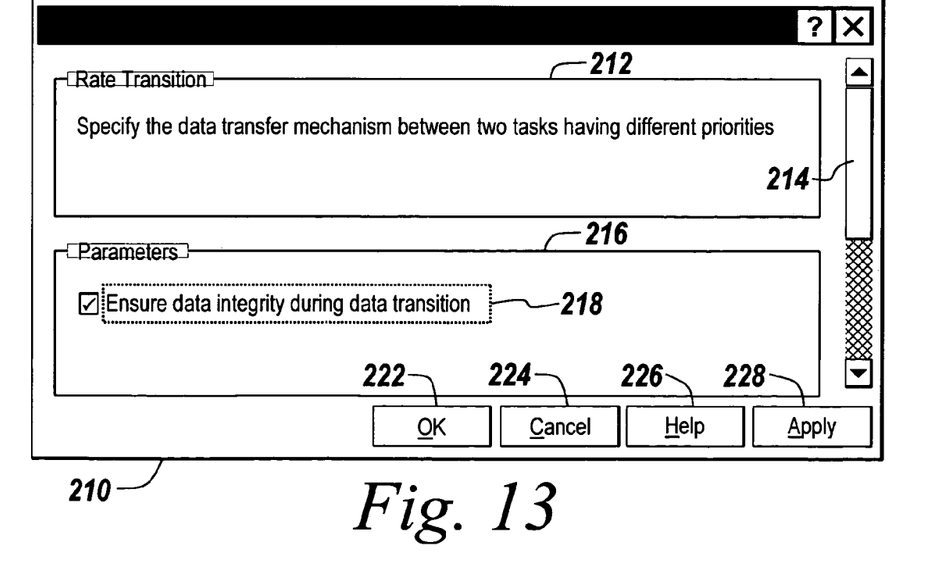
FIG. 13 depicts an exemplary window of a user interface provided by the illustrative embodiment of the present invention for selecting data characteristics of a data transfer in accordance with the illustrative embodiment of the present invention.

In Step 140, a user selects the data transfer characteristics they desire for transferring data using a rate transition block between tasks operating with different rate characteristics and different priorities. The user can select a data transfer characteristic that provides no data integrity or can select a data transfer characteristic that provides data integrity for the data transferred. FIG. 13, which is discussed below, illustrates an exemplary window 210 for use by a user to select the desired data transfer characteristics. Nevertheless, those skilled in the art will recognize that a user can choose to select data transfer characteristics in each instance where data is transferred between two tasks operating with different rate characteristics and different priorities or can choose to select data transfer characteristics of selected instances where data is transferred between two tasks having different rate characteristics and priorities.

In Step 142, the user's selected data transfer characteristics are determined. If the user did not select data integrity for the selected data transfer operation, the process moves to Step 144, and the data is transferred between the tasks without ensuring data integrity. In Step 142, if it is determined the user selected data transfer characteristics to ensure data integrity during the transfer, the process moves to Step 146 and the selected rate transition block, for example rate transition block 134, is configured to transfer the data using a portable marker.

FIG. 9 illustrates the steps taken in Step 146 to transfer data to ensure data integrity during the transfer. In Step 148, it is determined if the data transfer is occurring from a task operating with a higher priority than a task to receive the data. If the result of the determination in Step 148 is "Yes", then in Step 150, the code generated from the selected rate transition block transfers the data from the task having a high priority to the task having the lower priority using a portable marker accessible to both tasks. In this manner, the selected rate transition block is configured to preserve data integrity during the data transfer operation. The details of such a data transfer operation are discussed in more detail below with reference to FIG. 11.

If the result of the determination in Step 148 is "No" then the process moves to Step 152. In Step 152, it is determined if the data transfer is occurring from a task operating with a lower priority than the task to receive the data. If the result of the determination in Step 152 is "Yes", then in Step 154, the code generated from the selected rate transition block transfers the data using a buffer accessible to both tasks to prevent the task having the higher priority from preempting a memory access operation of the task having the lower priority. In this manner, the selected rate transition block copies the data from the task having the lower priority to the buffer for transfer to the task having the higher priority. Such a data transfer operation is discussed below in more detail with reference to FIG. 12. If the result of the determination in Step 152 is "No", then the process returns to Step 140 or alternatively ends.

Figure 10:
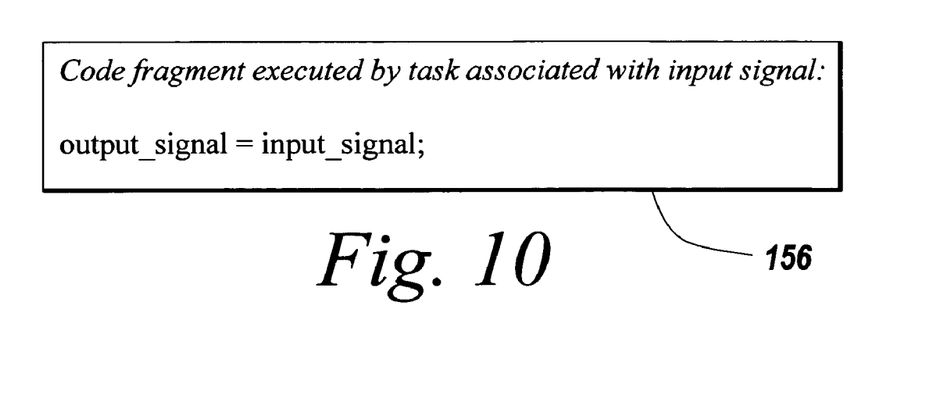
FIG. 10 illustrates exemplary pseudo-code for transferring data without regard for data integrity during the transfer.

FIG. 10 illustrates exemplary code generated by a selected rate transition block to transfer data between tasks operating with different rate characteristics and priorities without regard for data integrity. Pseudo-code 156 illustrates exemplary code statements or fragments generated by the selected rate transition block to transfer data between two tasks in a multi-rate graphical modeling environment without regard for data integrity. As such, data is transferable between the tasks using an assignment operation. In operation, a task associated with the rate transition block 130 executes a copy operation that copies data from a signal received from the first input node 124 to an output signal asserted on an output of the rate transition block 130 to algorithm block 136. The selected rate transition block if configured in this manner transfers data regardless whether data is being transferred from a task operating with a high priority to a task operating at a low priority or vice versa.

Figure 11:
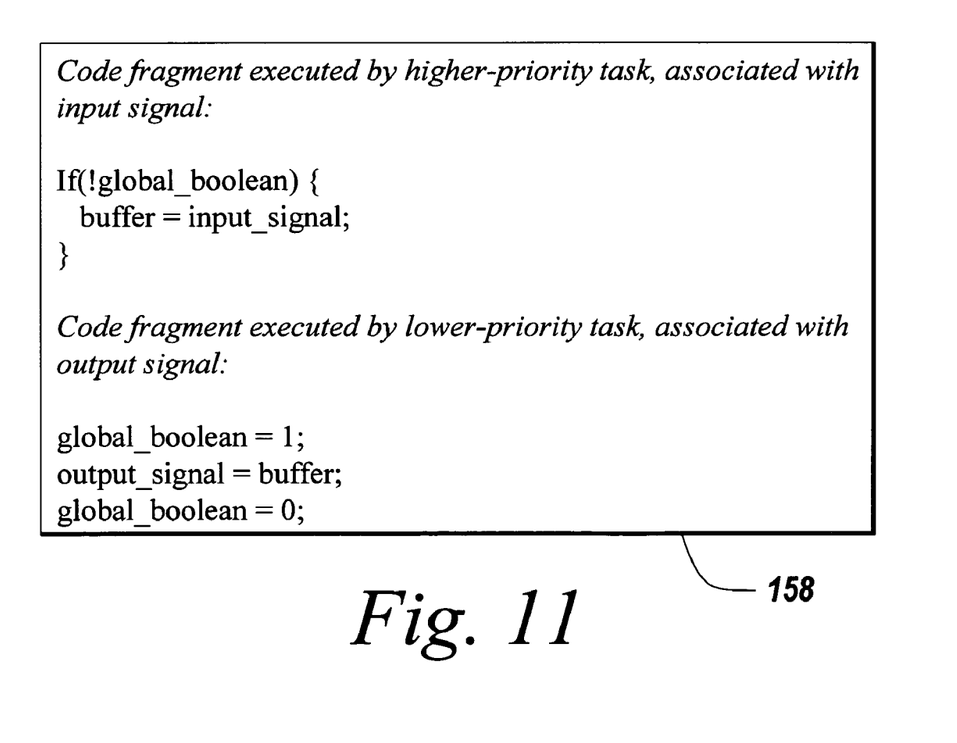
FIG. 11 illustrates exemplary pseudo-code for transferring data and ensuring data integrity that is suitable for practicing the illustrative embodiment of the present invention.

FIG. 11 illustrates exemplary pseudo-code suitable for providing a portable implementation of a data transfer mechanism for transferring data between two tasks operating with different rate characteristics and priorities to provide data integrity. Pseudo-code 158 represents code generated by rate transition block 130 to provide data integrity during a data transfer operation between two tasks operating with different rate characteristic and priorities. Pseudo-code 158 allows a selected rate transition block to transfer data as soon as it is available from the data source thus minimizing latency associated with the transfer of data between two tasks operating with different rate characteristics and priorities.

Pseudo-code 158 is suitable for use when the selected rate transition block is responsible for a data transfer operation from a task having a priority higher than the task to receive the data. Pseudo-code 158 illustrates use of a portable global, Boolean variable. Use of the portable global, Boolean variable provides data integrity when the selected rate transition block transfers data from a task assigned a priority higher than the task receiving the data.

To provide data integrity during such a data transfer operation, the task with the lower assigned priority is instructed to set the Boolean variable before attempting to read a memory buffer shared with the task having the higher assigned priority. A suitable buffer is buffer 202 or buffer 204 illustrated in FIG. 6. In this manner, if the task with the lower assigned priority is preempted by the task with the higher assigned priority while the task with the lower assigned priority is copying a value stored in the buffer 202 to an output signal, the set Boolean variable prevents the task with the higher assigned priority from updating the buffer holding the values being copied and accordingly updates buffer 204. As such, when control returns to the task with the lower assigned priority, the state of the buffer 202 is unchanged and thus holds values prior to the preemption of the task having the lower assigned priority by the task with the higher assigned priority. Accordingly, the task with the lower assigned priority copies the remainder of the selected values from the buffer 202 to the corresponding output signal. When the copy operation of the task with the lower assigned priority is complete, the set Boolean variable is cleared and the task with the higher assigned priority is free to update buffer 202. In this manner the task with the lower assigned priority copies uncorrupted data.

Figure 12:
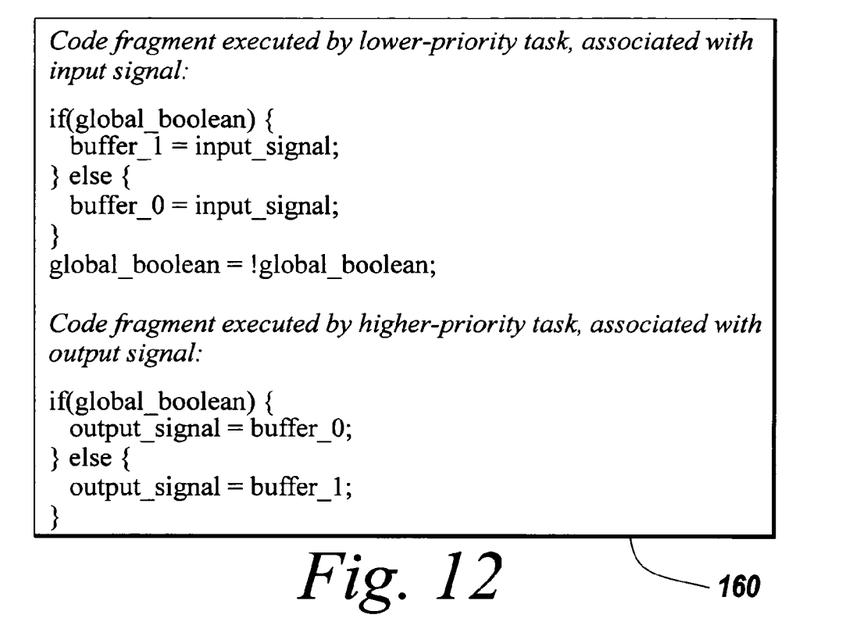
FIG. 12 illustrates exemplary pseudo-code for transferring data and ensuring data integrity that is suitable for practicing the illustrative embodiment of the present invention.

FIG. 12 illustrates exemplary pseudo-code suitable for use to provide data integrity when transferring data from a task with a lower assigned priority to a task with a higher assigned priority. In this configuration, the selected rate transition block uses a portable double buffer mechanism as illustrated by pseudo-code 160. Pseudo-code 160 illustrates exemplary code statements or code fragments to allow data integrity for data transfers from a task having a lower priority than the task receiving the data. In this instance, data integrity is ensured because the tasks use a shared, global Boolean variable to ensure that each task accesses different buffers even though both tasks share their usage of both buffers. For example, when the task assigned the lower of the priorities writes to buffer 202 the task with the higher of the assigned priorities reads from buffer 204. Consequently, if the task with the higher priority preempts the task with the lower assigned priority while the task with the lower assigned priority is writing to buffer 202 the task with the higher assigned priority reads from buffer 204. Hence, it is of no consequence that buffer 202 was partially updated and probably contains corrupted data values. When the task with the lower assigned priority completes writing to buffer 202 the selected rate transition block toggles the global Boolean variable and the task with the higher assigned priority and the task with the lower assigned priority toggle usage of buffers 202 and 204.

FIG. 13 illustrates an exemplary screen shot of a window associated with the user interface 200 and is used to illustrate an illustrative embodiment of the present invention from a user's perspective. Those skilled in the art will recognize that the user interface screen shot depicted in FIG. 13 is merely illustrative and can be depicted in a number of suitable manners. User interface 200 allows a user to configure each rate transition block 116, 130, 132, and 134 by selecting or specifying data transfer characteristics for the selected rate transition block to control or carry out.

Upon initialization of the user interface 200 and the graphical modeling environment 198, or at any time thereafter, a main window 210 is rendered on the display device 190 to allow a user to select or specify data transfer characteristics controlled or carried out by the rate transition blocks 116, 130, 132, and 134. Main window 210 provides the user with a series of graphical user interface objects such as a scroll bar 214 with an elevator, a text box 212, a text box 216 and buttons, "OK" 222, "Cancel" 224, "Help" 226 and "Apply" 228.

Text box 212 provides instructions to the user regarding the selection of data transfer characteristics for the data transfer mechanism of a selected rate transition block. Text box 216 includes check box 218 with respective narrative text that allows the user to select or specify the data transfer characteristics the user desires between two tasks operating at different rate characteristics and priorities. Scroll bar 214 allows the user to scroll and see additional text or additional check box options in text box 212 or text box 216.

The "OK" button 222 when selected causes the user interface 200 to accept the user's selection of data transfer characteristics for a selected rate transition block in the graphical modeling environment 198. Selection of "Cancel" button 224 cancels the user's selected data transfer characteristics. Selection of "Help" button 226 invokes a help function to provide further assistance to the user. Selection of "Apply" button 228 applies the user's selected data transfer characteristics to the selected rate transition block without closing the window 210.

While the present invention has been described with reference to an illustrative embodiment thereof, one skilled in the art will appreciate that there are changes in form and detail that may be made without departing from the intended scope of the present invention as defined in the pending claims. For example, those skilled in the art will recognize that FIG. 13 is built using standard Microsoft graphical program components, such as those found in Visual Basic.

What is claimed is:

1. A computer implemented method in a graphical modeling environment comprising:

providing a data transition block in a block diagram model interfacing with a first operation in the graphical modeling environment having a first priority and a second operation in the graphical modeling environment having a second priority, where at least one of the operations executes asynchronously, the data transition block having at least one parameter specifying a data transfer characteristic of data transferring between the first and second operation, the at least one parameter specifying whether to preserve data integrity during transfers of data between the first and the second operation, wherein the data transition block comprises a multi-rate data transition block having more than one operation operating at more than one operating rate; and transferring data through the data transition block between the first operation and the second operation using a data transfer option having the specified data transfer characteristic, wherein the transferring further comprises at least one of setting a marker that indicates when a task associated with one of the first and second blocks writes data for transferring or setting a marker that indicates when a task associated with one of the first and second blocks reads transferred data.

2. The method of claim 1, further comprising generating code for the data transfer option having the specified data transfer characteristic.

3. The method of claim 1, wherein the data transition block operates independent of a software platform operating in the electronic device.

4. The method of claim 1, wherein the data transition block does not disable an interrupt in the graphical modeling environment during transferring.

5. A computer implemented method in a graphical modeling environment for transferring data between a task associated with a first block from the graphical modeling environment operating at an asynchronous rate and assigned a first priority and a task associated with a second block from the graphical environment operating at a synchronous rate and assigned a second priority, the computer implemented method comprising:

providing at least one specified data transfer parameter for a transfer mechanism in the graphical modeling environment interfaced with the first block and the second block, the transfer mechanism controlling the transfer of data between the tasks associated with the first and second block, the at least one specified data transfer parameter specifying whether to preserve data integrity during transfers of data between the tasks associated with the first and second block, wherein the transfer mechanism comprises a multi-rate data transition block having more than one operation operating at more than one operating rate; and transferring the data between the tasks associated with the first block and the second block, the transfer mechanism controlling the transfer of data according to requirements specified by the at least one specified data transfer parameter, wherein the transferring further comprises at least one of setting a marker that indicates when the task associated with one of the first and second blocks writes data for transferring or setting a marker that indicates when the task associated with one of the first and second blocks reads transferred data.

6. An electronic device for executing and displaying a graphical modeling environment, the electronic device comprising:

an input device for receiving inputs to the graphical modeling environment; and a user interface for configuring a data transition block comprising a multi-rate data transition block having more than one operation operating at more than one operating rate, the user interface for configuring at least one data transfer characteristic of a data transfer between a first operation in the graphical modeling environment having a first priority and a second operation in the graphical modeling environment having a second priority, wherein at least one of the operations executes asynchronously, wherein at least one of the configurable data transfer characteristics specifies whether to preserve data integrity during transfers of data between the first operation and the second operation, and wherein the data transfer comprises at least one of setting a marker that indicates when a task associated with one of the first and second blocks writes data for transferring or setting a marker that indicates when a task associated with one of the first and second blocks reads transferred data.

7. The electronic device of claim 6, further comprising a display device, wherein the electronic device renders the user interface on the display device to allow a user to configure the at least one configurable data transfer characteristics.

8. The electronic device of claim 6, wherein the at least one configurable data transfer characteristics further comprises whether to minimize delay of the data transfer.

9. A computer-readable storage medium holding computer-readable instructions, the instructions including instructions for:

providing a graphical modeling environment having a data transition block in a block diagram model that interfaces with a first block in the graphical modeling environment operating at a first priority and a second block in the graphical modeling environment operating at a second priority, where at least one of the blocks executes asynchronously, the data transition block having at least one parameter specifying a data transfer characteristic of data transferring between tasks associated with the first and second block, the at least one parameter specifying whether to preserve data integrity during transfers of data between tasks associated with the first block and the second block, wherein the data transition block comprises a multi-rate data transition block having more than one operation operating at more than one operating rate; and transferring data between tasks associated with the first block and the second block using a data transfer option having the specified data transfer characteristic, wherein the transferring further comprises at least one of setting a marker that indicates when the task associated with one of the first and second blocks writes data for transferring or setting a marker that indicates when the task associated with one of the first and second blocks reads transferred data.

10. The computer-readable storage medium of claim 9, wherein the specified data transfer characteristic further comprises minimizing delay of the data transfer.

11. The computer-readable storage medium of claim 9, wherein the data transition block operates independent of a software platform operating on the electronic device.

12. The computer-readable storage medium of claim 11, wherein the specified data transfer characteristic is selectable by a user of the electronic device.

13. A device readable medium holding device readable instructions for performing a method for transferring data between a task associated with a first block in a graphical modeling environment operating at an asynchronous rate and assigned a first priority and a task associated with a second block in the graphical modeling environment operating at a synchronous rate and assigned a second priority, the method comprising:

providing at least one specified data transfer property of a transfer mechanism in a graphical modeling environment interfaced with the task associated with the first block and the task associated with the second block, the transfer mechanism controlling the transfer of data between the tasks associated with the first and second blocks, the at least one specified data transfer property specifying whether to preserve data integrity during transfers of data between the tasks associated with the first block and the second block, wherein the transfer mechanism comprises a multi-rate data transition block having more than one operation operating at more than one operating rate; and transferring data between the tasks associated with the first block and the second block, the transfer mechanism controlling the data transfer of between the tasks associated with the first block and the second block according to requirements specified by the at least one specified data transfer property, wherein the transferring further comprises at least one of setting a portable marker that indicates when the task associated with one of the first and second blocks writes data for transferring or setting a portable marker that indicates when the task associated with one of the first and second blocks reads transferred data.

14. The medium of claim 13, wherein transferring further comprises setting a variable that indicates when the task associated with one of the first and second blocks writes data for transferring.

15. The medium of claim 13, wherein transferring further comprises setting a variable that indicates when the task associated with one of the first and second blocks reads transferred data.

16. A computer-readable storage medium holding computer-executable instructions for a graphical modeling environment, the instructions comprising instructions for:

providing a first block that operates at a first rate and a first priority;

providing a second block that operates at a second rate and a second priority, wherein at least one of the second rate or second priority is different from the first rate or the first priority;

providing a data transfer block having a non-empty set of data transfer properties that specify characteristics of transfers of data controlled by the data transfer block, the data transfer block being connected to the first block and the second block and executing transfers of data between the first block and the second block;

selecting a data transfer option for transfers of data between the first block and the second block, the data transfer option specifying how to execute transfers of data having attributes corresponding to the set of data transfer properties of the data transfer block, the data transfer option compatible with maintaining execution of a real-time operating system; and executing the transfer of data between the first block and the second block by transferring data between the first block and the second block using the selected data transfer option.

17. The computer-readable storage medium of claim 16, wherein the first rate is different from the second rate and the selected data transfer option comprises two data transfer operations, one of the two data transfer operations operates at the first rate and the other of the two data transfer operations operates at the second rate.

\* \* \* \* \*

UNITED STATES PATENT AND TRADEMARK OFFICE
CERTIFICATE OF CORRECTION

PATENT NO.         : 7,493,619 B1
APPLICATION NO.    : 10/914867
DATED              : February 17, 2009
INVENTOR(S)        : Matthew Englehart et al.

Page 1 of 1

It is certified that error appears in the above-identified patent and that said Letters Patent is hereby corrected as shown below:

At Column 14, line 31 (claim 8) please change "characteristics" to --characteristic--.

At Column 14, line 41 (claim 9) please delete "of the blocks executes asynchronously, the data transition block having at least one".

At Column 14, line 55 (claim 9) please delete "the".

At Column 15, line 27 (claim 13) please add --data-- after "of".

Signed and Sealed this

Second Day of June, 2009

JOHN DOLL
*Acting Director of the United States Patent and Trademark Office*